US012304472B2

(12) United States Patent
Sano

(10) Patent No.: US 12,304,472 B2
(45) Date of Patent: May 20, 2025

(54) DRIVING ASSIST METHOD AND DRIVING ASSIST DEVICE FOR VEHICLE AND MEDIUM

(71) Applicant: TOYOTA JIDOSHA KABUSHIKI KAISHA, Toyota (JP)

(72) Inventor: Shunta Sano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 78 days.

(21) Appl. No.: 18/233,450

(22) Filed: Aug. 14, 2023

(65) Prior Publication Data

US 2025/0058774 A1 Feb. 20, 2025

(30) Foreign Application Priority Data

Sep. 14, 2022 (JP) .................................. 2022-146427

(51) Int. Cl.
*B60W 30/095* (2012.01)
*B60W 10/20* (2006.01)
*G08G 1/16* (2006.01)

(52) U.S. Cl.
CPC ........ *B60W 30/0953* (2013.01); *B60W 10/20* (2013.01); *G08G 1/16* (2013.01)

(58) Field of Classification Search
CPC ..... B60W 30/0953; B60W 10/20; G08G 1/16
USPC .......................................................... 701/41
See application file for complete search history.

(56) References Cited

U.S. PATENT DOCUMENTS

| 9,105,190 | B2 | 8/2015 | Akiyama |
| 9,393,960 | B2 | 7/2016 | Kodaira |
| 9,483,945 | B2 | 11/2016 | Okita et al. |
| 9,873,412 | B2 | 1/2018 | Moriizumi |
| 10,793,147 | B2 | 10/2020 | Kaminade et al. |
| 2013/0218415 | A1* | 8/2013 | Stahlin ................. B60W 50/06 701/41 |
| 2016/0280134 | A1* | 9/2016 | Miura ..................... G08G 1/04 |
| 2019/0039624 | A1 | 2/2019 | Ike et al. |
| 2021/0061309 | A1 | 3/2021 | Kawanai |
| 2021/0107521 | A1 | 4/2021 | Fujita et al. |
| 2021/0107528 | A1 | 4/2021 | Fujita et al. |
| 2021/0146956 | A1 | 5/2021 | Fujita et al. |

(Continued)

FOREIGN PATENT DOCUMENTS

JP 2019-026129 A 2/2019

*Primary Examiner* — Yi-Kai Wang
(74) *Attorney, Agent, or Firm* — Dinsmore & Shohl LLP

(57) ABSTRACT

A method to assist a driving of a vehicle comprising the steps of: executing a travel assist control for avoiding a risk factor in front of the vehicle based on driving environment information of the vehicle; counting a time during which a vehicle operation requiring an operator of the vehicle to stop the execution of the travel assist control is detected after the start of the execution of the travel assist control; and stopping the execution of the travel assist control when the time exceeds a specified time. The method further comprising the steps of: evaluating an associated risk caused by a continuation of the execution of the travel assist control based on the driving environment information during counting of the time during which the detection of the vehicle operation continues; and shortening the specified time based on a result of the evaluation of the associated risk.

5 Claims, 10 Drawing Sheets

(56) References Cited

U.S. PATENT DOCUMENTS

2021/0146958 A1    5/2021  Tanaka et al.
2021/0229660 A1*   7/2021  Kamatani ............. B60W 10/04

* cited by examiner

DRIVING ASSIST METHOD AND DRIVING ASSIST DEVICE FOR VEHICLE AND MEDIUM

CROSS-REFERENCE TO RELATED APPLICATION

The present application claims priority under 35 U.S.C. § 119 to Japanese Patent Application No. 2022-146427, filed on Sep. 14, 2022, the contents of which application are incorporated herein by reference in their entirety.

FIELD

The present disclosure relates to a method and a device to assist a driving of a vehicle and a computer-readable medium.

BACKGROUND ART

JP2019-026129A discloses a method to assist a driving of a vehicle. In this related art, it is determined whether or not a start condition for an execution of travel assist control for avoiding a collision with an obstacle ahead of the vehicle is satisfied. This related art also determines whether or not a permission condition for an execution of the travel assist control is satisfied. In the related art, when the permission condition is satisfied before the satisfaction of the start condition, the travel assist control is executed. On the other hand, even when the start condition is satisfied, if the permission condition is not satisfied before that, the execution of the travel assist control is cancelled.

The above-described related art relates to the travel assist control executed in a situation where the vehicle is likely to collide with the obstacle and the cancellation of the execution of the travel assist control. In the present application, travel assist control executed in a situation one step before such a travel assist control, that is, a situation in which a possibility of the vehicle colliding with the obstacle is not high will be considered. This travel assist control is executed to avoid a risk factor by regarding a walker or the like in front of the vehicle as the risk factor.

It is considered that after the execution of the travel assist control for avoiding the risk factor is started, the execution is stopped. As a method in this case, it may be determined whether or not a condition for stopping the execution of the travel assist control is satisfied while starting the execution from a timing at which a start condition for the execution of the travel assist control is satisfied. An example of the stop condition is that a predetermined vehicle operation requesting the stop of the execution of the travel assist control is continuously detected.

Unlike the travel assist control for avoiding the collision with the obstacle, it is difficult for a vehicle operator to recognize a necessity of the ongoing travel assist control for avoiding the risk factor. Therefore, it is conceivable that the vehicle operator who does not recognize the necessity of the ongoing travel assist control accidentally performs the predetermined vehicle operation. On the other hand, when the vehicle operator notices the vehicle behavior based on the ongoing travel assist control and recognizes the necessity of that, the predetermined vehicle operation may be stopped. However, it is also conceivable that the vehicle operator who notices vehicle behavior based on the ongoing travel assist control but does not agree with that intentionally performs the predetermined vehicle operation. Therefore, continuous detection of the predetermined vehicle operation is considered to be appropriate as the stop condition.

According to the above-described method with regard to the risk factor, the travel assist control is executed from the timing at which the start condition is satisfied to the timing at which the stop condition is satisfied. However, a continuous execution of the travel assist control for avoiding the risk factor may cause a new risk that affects a driving safety of the vehicle. Therefore, even in such a case, it is difficult to say that it is practical to determine the stop of the execution of the travel assist control based on the above-described method with regard to the risk factor. Therefore, an improvement for easily stopping the execution of the travel assist control is desired.

SUMMARY

An object of the present disclosure is to provide a technique capable of appropriately stopping the execution of the travel assist control for avoiding the risk factor after the start of this0 execution.

A first aspect of the present disclosure is a method to assist a driving of a vehicle, and has the following features.

The method comprising the steps of: executing a travel assist control for avoiding a risk factor in front of the vehicle based on driving environment information of the vehicle; counting a time during which a vehicle operation requiring an operator of the vehicle to stop the execution of the travel assist control is detected after the start of the execution of the travel assist control; and stopping the execution of the travel assist control when the time during which the vehicle operation is detected exceeds a specified time.

The method further comprising the steps of: evaluating an associated risk caused by a continuation of the execution of the travel assist control based on the driving environment information during counting of the time during which the detection of the vehicle operation continues; and shortening the specified time based on a result of the evaluation of the associated risk.

A second aspect of the present disclosure is a device to assist a driving of a vehicle, and has the following features.

The device includes a memory device in which driving environment information of the vehicle is stored, and a processor. The processor is configured to: execute a travel assist control for avoiding a risk factor in front of the vehicle based on the driving environment information; count a time during which a vehicle operation requesting a stop of the execution by an operator of the vehicle is detected after the execution of the travel assist control is started; and stop the execution of the travel assist control when the time during which the detection of the vehicle operation is continued exceeds a specified time. The processor is further configured to: evaluate an associated risk caused by a continuation of the execution of the travel assist control based on the driving environment information during counting of the time during which detection of the vehicle operation continues; and shorten the specified time based on a result of evaluation of the associated risk.

A third aspect of the present disclosure is a non-transitory computer-readable medium storing a program for causing a computer to execute processing to assist a driving of a vehicle, and has the following features.

The program causes the computer to execute: processing to execute a travel assist control for avoiding a risk factor in front of the vehicle based on driving environment information; processing to count a time during which a vehicle operation requesting a stop of the execution by an operator of the vehicle is detected after the execution of the travel assist control is started; processing to stop the execution of the travel assist control when the time during which the detection of the vehicle operation is continued exceeds a specified time; processing to evaluate an associated risk caused by a continuation of the execution of the travel assist control based on the driving environment information during counting of the time during which detection of the vehicle operation continues; and processing to shorten the specified time based on a result of evaluation of the associated risk.

According to the first to third aspects of the present disclosure, when the vehicle operation requesting to stop the execution of the travel assist control for avoiding the risk factor in front of the vehicle is detected, the time during which the detection continues is counted. When the duration time exceeds the specified time, the execution of the travel assist control is stopped. In addition, during the counting of the time during which the detection of the vehicle operation continues, the associated risk that occurs with the continuation of the execution of the travel assist control is evaluated, and the specified time is shortened based on the result of the evaluation.

If the specified time is shortened based on the result of the evaluation of the associated risk, it is possible to easily stop the execution of the travel assist control when a new risk that is caused by continuing the execution of the travel assist control and affects the driving safety of the vehicle is recognized. Therefore, according to the aspect of the present disclosure, it is possible to improve the driving safety of the vehicle by appropriately executing the travel assist control or appropriately stopping the execution of the travel assist control.

DESCRIPTION OF EMBODIMENT

Hereinafter, an embodiment of a method and a device for assisting a drive of a vehicle and a computer-readable medium in which a program for assisting the drive of the vehicle is stored will be described with reference to the drawings.

1. Travel Assist Control

Figure 1:
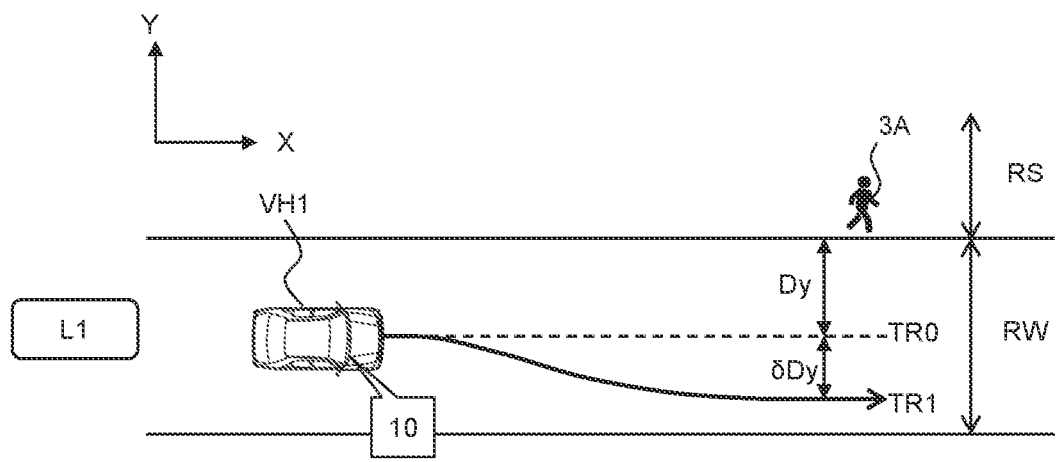
FIG. 1 is a diagram illustrating a premise of an embodiment of the present disclosure.
Figure 2:
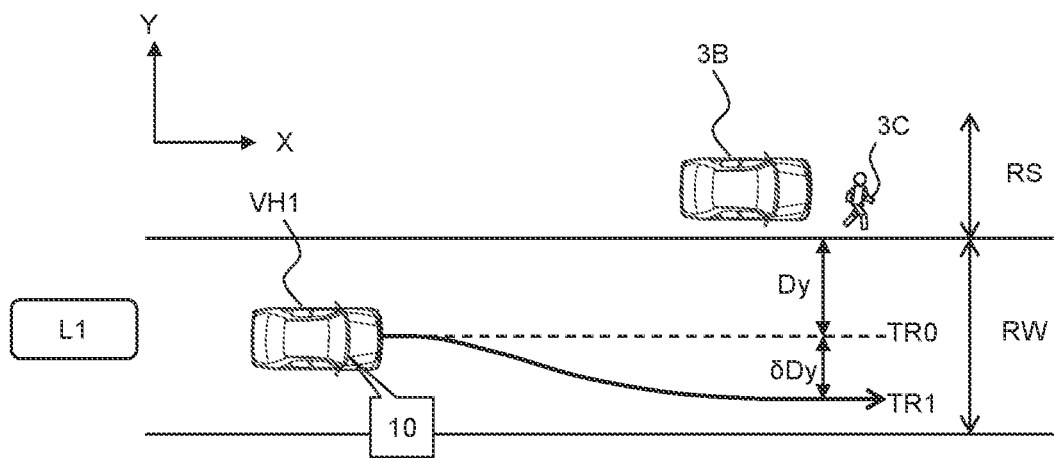
FIG. 2 is a diagram illustrating the premise of the embodiment.

FIGS. 1 and 2 are diagrams illustrating the premise of the embodiment. The driving assist device 10 according to the embodiment executes "travel assist control" for assisting the driving of the vehicle VH1. The travel assist control may be included in the autonomous driving control. Typically, the driving assist device 10 is mounted on the vehicle VH1. At least a portion of the driving assist device 10 may be disposed in a device (e.g., an external server) outside the vehicle VH1 and may remotely perform the travel assist control. That is, the driving assist device 10 may be dispersedly disposed in the vehicle VH1 and the external device.

The travel assist control includes "risk avoidance control" for avoiding a risk factor 3 in front of the vehicle VH1. In the risk avoidance control, the driving assist device 10 automatically performs at least one of steering and deceleration of the vehicle VH1 in order to avoid the risk factor 3 in front of the vehicle VH1. For example, in FIG. 1, the vehicle VH1 is traveling on a lane L1 in a roadway RW. A breakdown lane RS is adjacent to the lane L1. A walker 3A existing in the breakdown lane RS in front of the vehicle VH1 may enter the roadway RW. Therefore, the walker 3A can be said to be the risk factor 3.

In the example shown in FIG. 1, the risk avoidance control includes "steering assist control" for automatically performing a steering of the vehicle VH1 so as to avoid the walker 3A in advance. The risk avoidance control may include "decelerating assist control" that automatically decelerates the vehicle VH1 so as to avoid the walker 3A in advance. In the steering assist control, the driving assist device 10 steers the vehicle VH1 in a direction away from the walker 3A. The walker 3A may be replaced by a bicycle or a two wheeled vehicle. The risk factor 3 includes not only the breakdown lane RS but also a walker, a bicycle, a two-wheeled vehicle, and the like present on the roadway RW.

FIG. 2 is a diagram for explaining another example of the risk avoidance control. The risk factor 3 is not limited to an "overt risk" such as the walker 3A shown in FIG. 1. The risk factor 3 may also include a "potential risk". For example, in FIG. 2, a parked vehicle 3B exists in the breakdown lane RS in front of the vehicle VH1. An area ahead of the parked vehicle 3B is a blind spot of the vehicle VH1, and there is a possibility that a walker 3C jumps out from the blind spot. Therefore, it can be said that the parking vehicle 3B and the walker 3C are risk factors 3 (e.g., the potential risk).

In the example shown in FIG. 2, the risk avoidance control includes the steering assist control for automatically performing the steering of the vehicle VH1 so as to avoid the parked vehicle 3B in advance. In this steering assist control, the driving assist device 10 steers the vehicle VH1 in a direction away from the parked vehicle 3B. As in the example shown in FIG. 1, the risk avoidance control may include the decrementing assist control.

Here, a vehicle coordinate system (X, Y) is defined. The vehicle coordinate system (X, Y) is a relative coordinate system fixed to the vehicle VH1 and changes with a movement of the vehicle VH1. The X-direction is the travel direction of the vehicle VH1. The Y direction is the transverse direction of the vehicle VH1. The X direction and the Y direction are orthogonal to each other.

In FIGS. 1 and 2, the trajectory TR0 represents a driving trajectory of the vehicle VH1 when the steering assist control is not performed. When steering assist control is not performed, it is assumed that the vehicle VH1 travels in parallel with the lane L1. Thus, the trajectory TR0 extends parallel to the lane VH1 from the actual position of the vehicle L1.

In the following description, the lateral distance Dy is the shortest distance between the trajectory TR0 and the risk factor 3. In other words, the lateral distance Dy is a distance in the Y direction between the vehicle VH1 (the trajectory TR0) and the risk factor 3 when the vehicle VH1 passes by the side of the risk factor 3.

In FIGS. 1 and 2, a first trajectory TR1 represents the driving trajectory of the vehicle VH1 when the steering assist control is performed. When the steering assist control is executed, the vehicle VH1 moves in a direction away from the risk factor 3. The lateral movement amount δDy is a movement amount of the vehicle VH1 caused by the steering assist control in a direction away from the risk factor 3. In other words, the lateral movement amount δDy is a movement amount of the vehicle VH1 viewed from the trajectory TR0 in the direction away from the risk factor 3.

The risk avoidance control is stopped when a predetermined vehicle operation requesting to stop the execution of the risk avoidance control is continuously detected after the start of the execution of the risk avoidance control. When the decrementing assist control is performed as the risk avoidance control, the predetermined vehicle operation is exemplified by an operation of depressing an accelerator pedal by an operator of the vehicle VH1. When steering assist control is performed as the risk avoidance control, a counter-steering operation of a steering wheel by the operator of the vehicle VH1 is exemplified as the predetermined vehicle operation. The counter-steering action here refers to an action of turning the steering wheel in a direction opposite to the direction away from the risk factor 3.

The continuous detection of the predetermined vehicle operation is determined by comparing the duration of the detection signal of the predetermined vehicle operation with the specified time PT. The specified time PT is set to several seconds (e.g., 1 to 5 seconds) as a time required for the operator of the vehicle to notice the vehicle behavior based on the risk avoidance control being executed, recognize the surrounding environment of the vehicle, and recognize the necessity of the risk avoidance control. Although the specified time PT is set to a fixed time, the specified time PT may be set to increase or decrease according to the vehicle speed. If the duration time ET of the detection signal is greater than the specified time, the execution of the risk avoidance control is stopped.

2. Features of Embodiment

Figure 3:
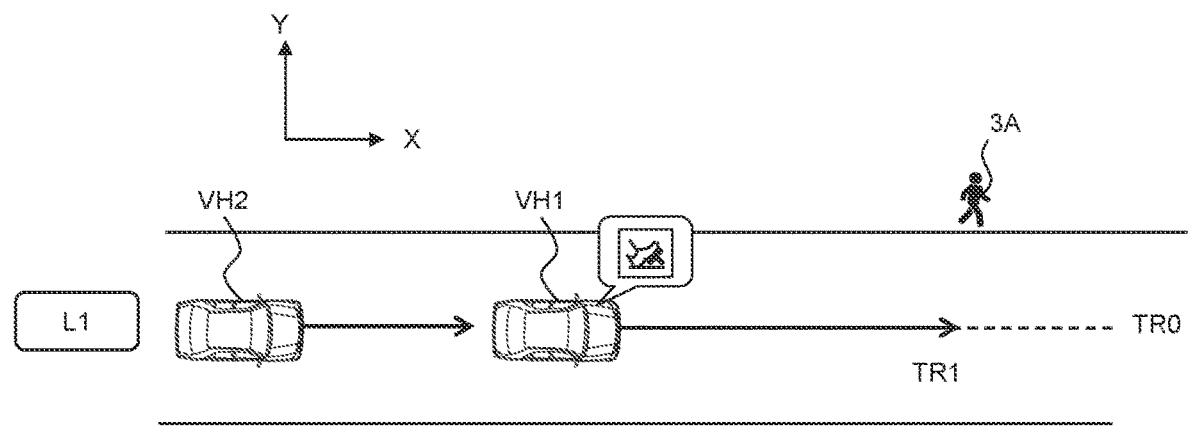
FIG. 3 is a diagram illustrating a first risk that occurs with continuation of execution of the risk avoidance control.

As a problem of the risk avoidance control, there may be mentioned that continuing the execution thereof causes a new risk affecting the driving safety of the vehicle VH1. FIG. 3 is a diagram illustrating a first risk that occurs with continuation of execution of the risk avoidance control. In the example shown in FIG. 3, decrementing assist control is performed as risk avoidance control for avoiding the walker 3A in advance. However, the vehicle VH1 traveling in the lane L1 is present behind a vehicle VH2. Therefore, when the execution of the risk avoidance control is continued, a rear-end collision risk due to the vehicle VH2 occurs.

Figure 4:
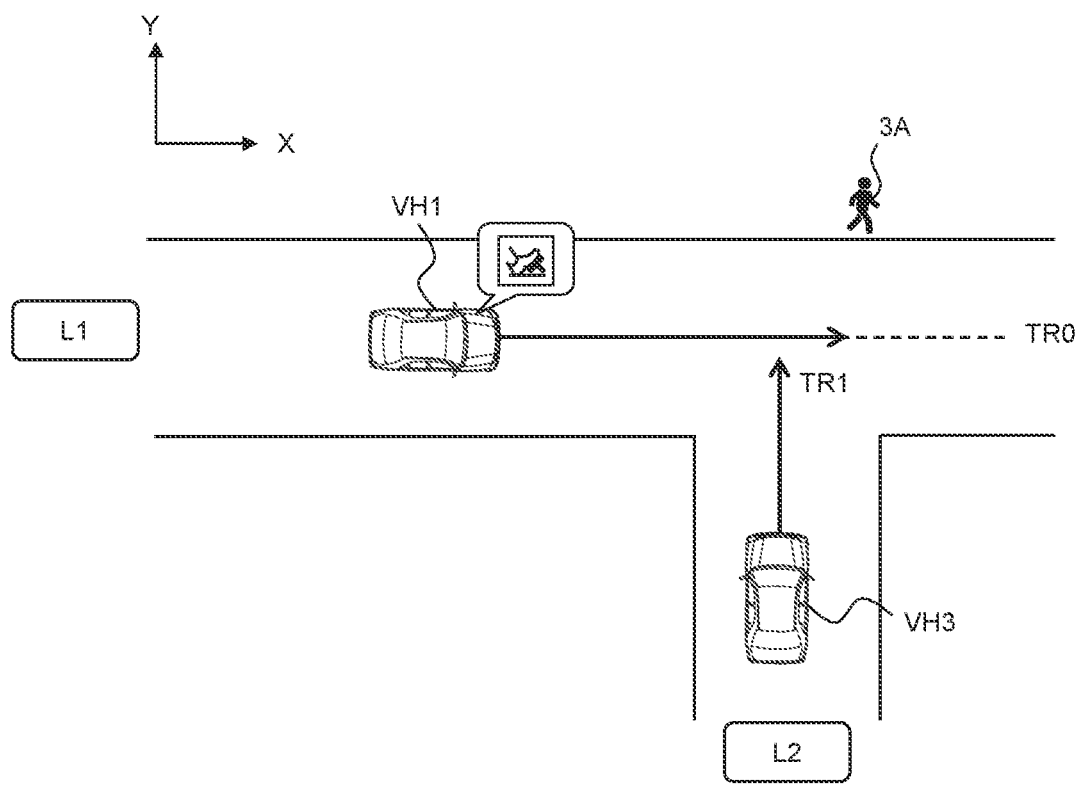
FIG. 4 is a diagram for explaining a second risk caused by continuation of execution of the risk avoidance control.

FIG. 4 is a diagram for explaining a second risk caused by continuation of execution of the risk avoidance control. In the example shown in FIG. 4, a lane L2 intersects the lane L1, and walker 3A is located near the interfluent point of these lanes. In the example shown in FIG. 4, the vehicle VH3 is traveling on the lane L2. In the example shown in FIG. 4, the decrementing assist control is performed similarly to the example shown in FIG. 3. Therefore, when the execution of the decrementing assist control is continued, there is a risk that the timing at which the vehicle VH1 reaches the interfluent point and the timing at which the vehicle VH3 enters the lane L1 overlap each other, that is, a collision risk with the vehicle VH3 occurs.

Figure 5:
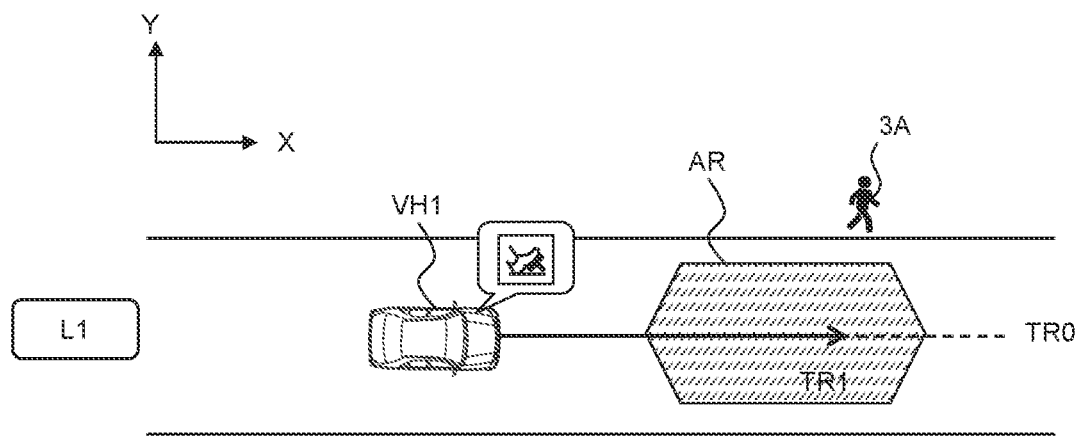
FIG. 5 is a diagram for explaining a third risk caused by continuation of execution of the risk avoidance control.

FIG. 5 is a diagram for explaining a third risk caused by continuation of execution of the risk avoidance control. In the example shown in FIG. 5, a part of the road surface in front of the road surface in front of vehicle VH1 is frozen, and walker 3A is located ahead of area A R. In the example shown in FIG. 5, the decrementing assist control is performed similarly to the example shown in FIG. 3. Therefore, if the execution of the decelerating assist control is continued, there is a risk that the vehicle VH1 falls into the slip state when the vehicle VH1 enters the area AR. This slip risk also occurs when the steering assist control is performed as the risk avoidance control.

Figure 6:
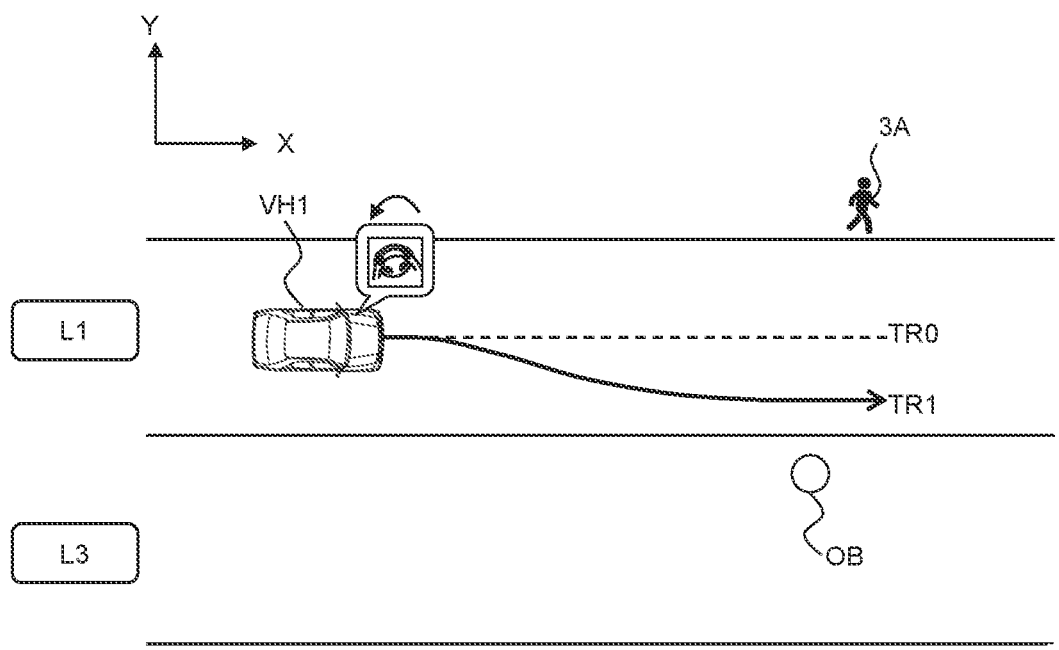
FIG. 6 is a diagram for explaining a fourth risk caused by continuation of execution of the risk avoidance control.

FIG. 6 is a diagram for explaining a fourth risk caused by continuation of execution of the risk avoidance control. In the example illustrated in FIG. 6, an object OB (for example, a fallen object) that is not classified as the risk L1 is present on a lane L3 adjacent to the lane factor 3, and the object OB is located in front of the walker 3A. In the example shown in FIG. 4, steering assist control is performed as risk avoidance control for avoiding the walker 3A in advance. Therefore, when the execution of the steering assist control is continued, there is a risk that the vehicle VH1 encounters the object OB.

The operator of the vehicle VH1 who has recognized the various associated risks described in FIGS. 3 to 6 is expected to perform a predetermined vehicle operation that requests cancellation of the risk avoidance control being executed. To be specific, in the examples shown in FIGS. 3 to 5, it is expected that the operator of the vehicle VH1 performs an operation of depressing the accelerator pedal. In the example shown in FIG. 6, it is expected that the operator of the vehicle VH1 performs the counter-steering operation. In the example shown in FIG. 5, the counter-steering operation when the steering assist control is performed as the risk avoidance control is considered to be a predetermined vehicle operation that requests the stop of this execution.

The signal corresponding to the predetermined vehicle operation is detected before or after the start of the execution of the risk avoidance control. In an embodiment, if this signal is detected after the start of the execution of risk avoidance control, the duration of this detection (duration time ET) is counted. Then, if the duration time ET exceeds the specified time, the risk avoidance control being executed is stopped. However, if the specified time PT is a predetermined time, the operator of the vehicle VH1 feels uneasy when the associated risk increases due to the continuation of the risk avoidance control being executed.

Therefore, in the embodiment, when the execution of the risk avoidance control is started, the risk (the associated risk) generated along with the continuation of the execution is evaluated. The associated risk is evaluated during the counting of the duration time ET, for example. Then, the specified time PT is shortened based on the result of the evaluation of the associated risk.

For example, when it is determined that there is the associated risk, the specified time C0 is multiplied by a coefficient C0 (0<PT<1). As a result, the specified time PT is shortened when there is the associated risk. In another example, the specified time C1 is multiplied by a coefficient C1 according to the height of the associated risk (0<PT<1).

As a result, the specified time PT is shortened according to the height of the associated risk.

If the specified time PT is shortened based on the result of the evaluation of the associated risk, the execution of the risk avoidance control can be easily stopped when the risk (the associated risk) caused by the continuation of the execution of the risk avoidance control is recognized. Therefore, according to the aspect of the present disclosure, it is possible to improve the driving safety of the vehicle VH1 by appropriately executing the risk avoidance control or appropriately stopping the execution of the risk avoidance control.

3. Driving Assist Device

3-1. Configuration Example

Figure 7:
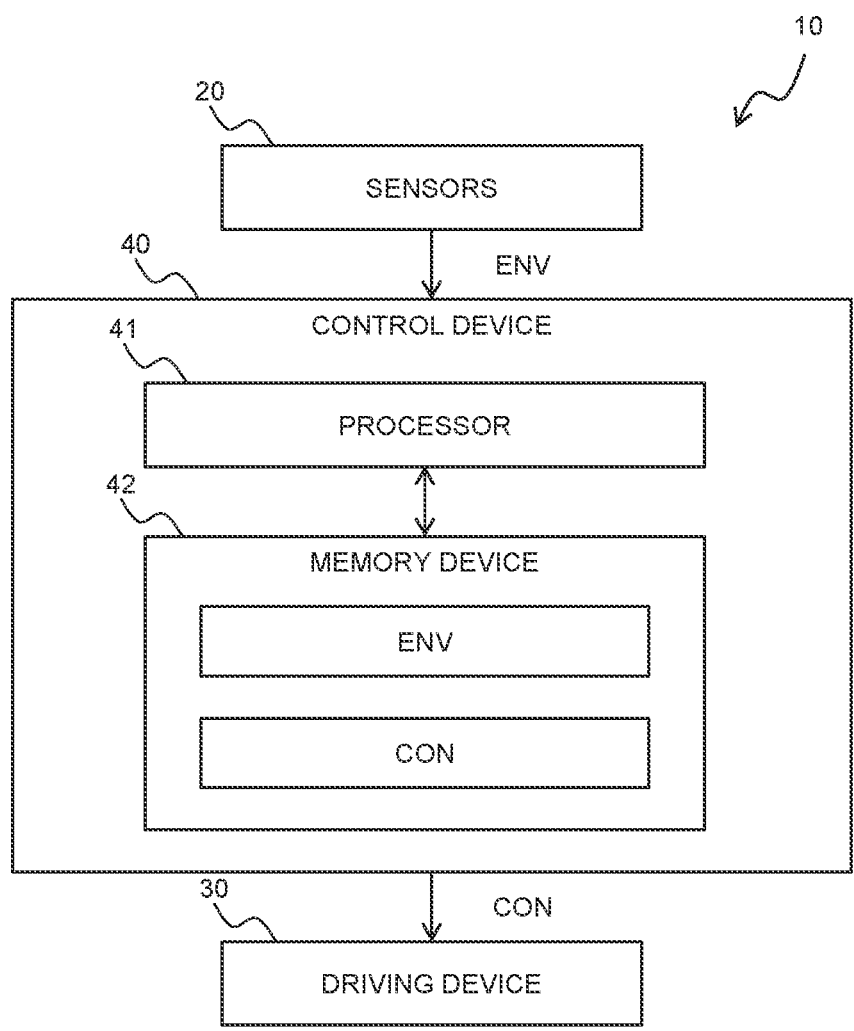
FIG. 7 is a block diagram illustrating a configuration example of a driving assist device according to an embodiment.

FIG. 7 is a block diagram illustrating an example configuration of a driving assist device 10 according to an embodiment. In the example shown in FIG. 7, the driving assist device 10 includes sensors 20, a driving device 30, and a control device 40.

The sensors 20 include, for example, a position sensor, a state sensor, and a recognition sensor. The position sensor detects the position and orientation of the vehicle VH1. As the position sensor, a global positioning system (GPS) sensor is exemplified. The status sensor detects an internal status of the vehicle VH1. Examples of the state sensor include a vehicle speed sensor, a yaw rate sensor, a lateral acceleration sensor, a steering angle sensor, and the like. The recognition sensor recognizes (detects) a situation around the vehicle VH1. Examples of the recognition sensor include a camera, a radar, and a laser imaging detection and ranging (LIDAR).

Each sensor included in the sensors 20 transmits detected or recognized information to the control device 40. Information transmitted from each sensor to the control device 40 constitutes driving environment information ENV. The driving environment information ENV also includes map information. The map information includes information on arrangement of lanes and information on shapes of roads. The map information is stored in, for example, a predetermined memory device included in the vehicle VH1. The map information may be stored in a device external to the vehicle VH1 (for example, an external server).

The driving device 30 includes a steering device, a driving device, and a braking device. The steering device steers wheels of the vehicle VH1. For example, the steering device includes an electric power steering (EPS) device. The driving device is a power source for generating a driving force. Examples of the driving device include an engine, an electric motor, and an in-wheel motor. The braking device generates a braking force.

The control device 40 controls the vehicle VH1. Typically, the control device 40 is a microcomputer mounted on vehicle 1. The control device 40 is also referred to as an electronic control unit (ECU). The control device 40 may be an information processing device outside the vehicle VH1. In this case, the control device 40 communicates with the vehicle VH1 and remotely controls the vehicle VH1.

The control device 40 includes a processor 41 and a memory device 42. The processor 41 executes various processes. The memory device 42 is a volatile memory, a nonvolatile memory, or the like, and various information is stored therein. As the various information, driving environment information ENV is exemplified. The various information also includes control information CON transmitted to the driving device 30. When the processor 41 executes a control program which is a computer program, various processing by the processor 41 are realized. The control program is stored in the memory device 42 or recorded on a computer-readable medium. The control program includes a travel assist program according to the embodiment.

3-2. Processing Example by Control Device

Figure 8:
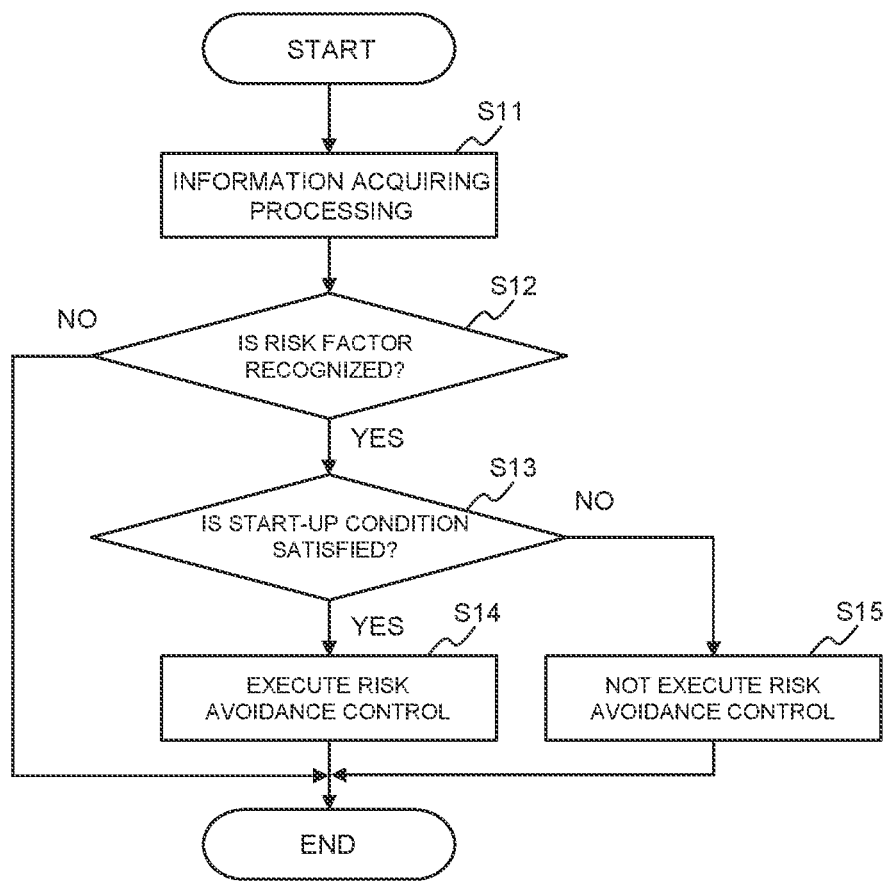
FIG. 8 is a flow chart illustrating processing particularly related to risk avoidance control performed by the control device.
Figure 9:
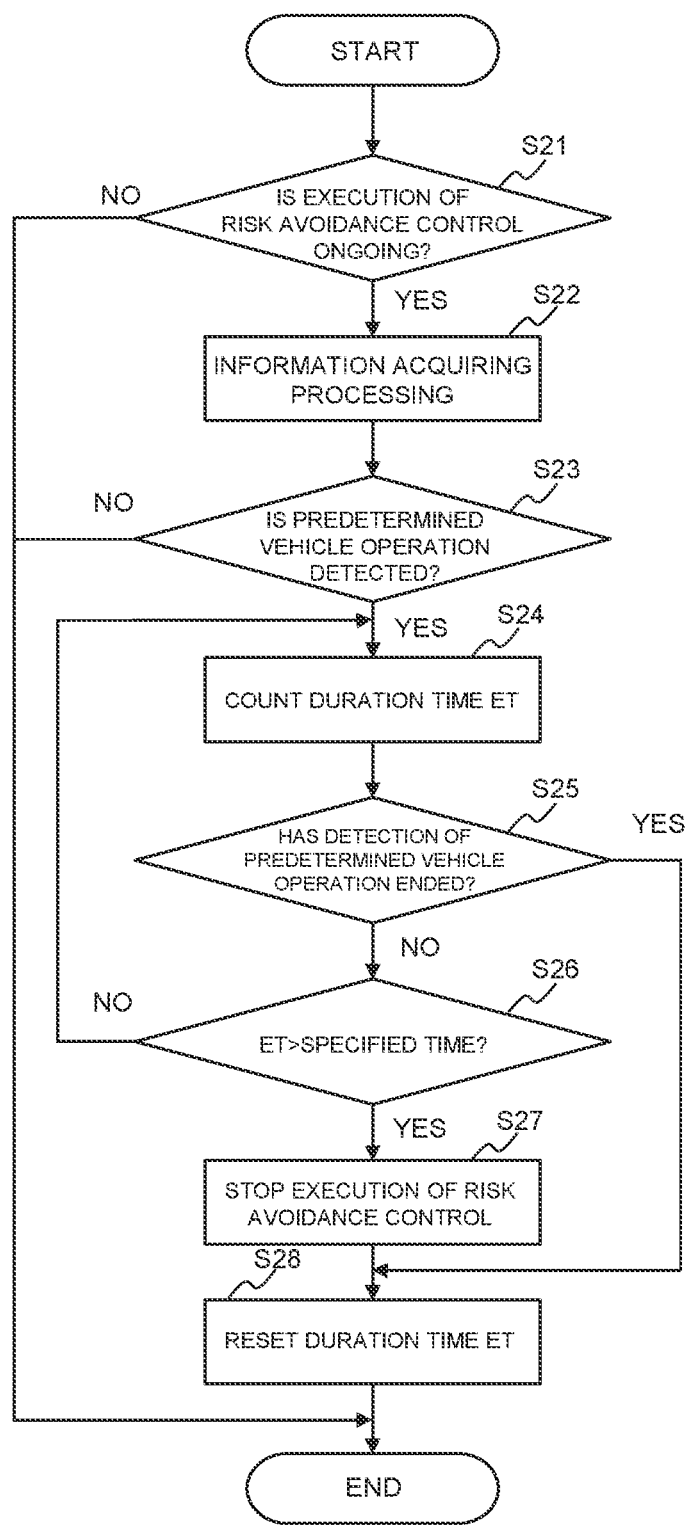
FIG. 9 is a flow chart illustrating processing performed by the control device and particularly related to risk avoidance control.
Figure 10:
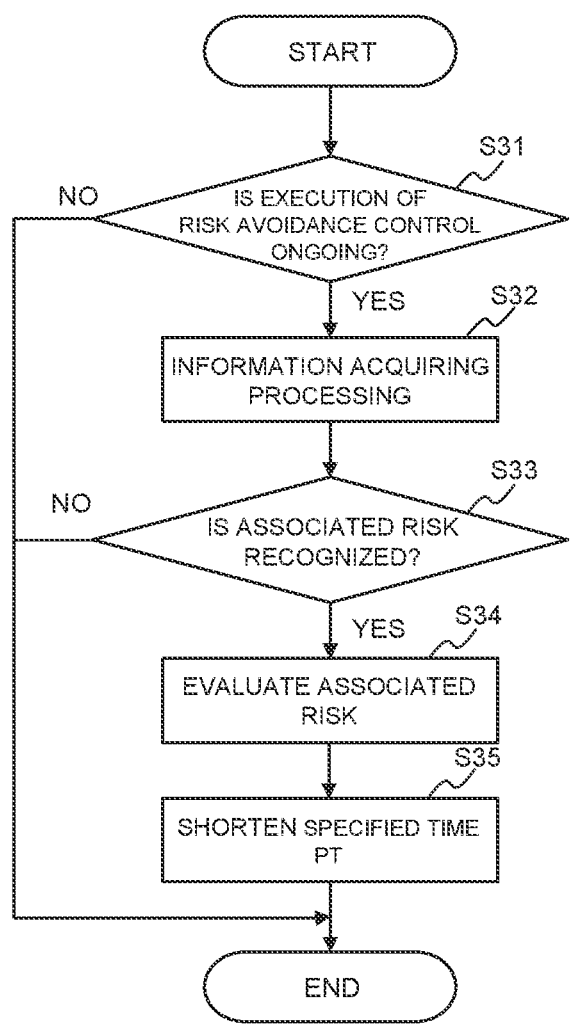
FIG. 10 is a flowchart illustrating processing particularly related to risk avoidance control performed by the control device.

FIGS. 8 to 10 are flowcharts showing processes particularly related to the risk avoidance control performed by the processor 41. The processing flows shown in FIGS. 8 to 10 are repeatedly executed every predetermined cycle.

In the processing flow shown in FIG. 8, first, information acquiring processing is performed (step S11). In the information acquiring processing, the driving environment information ENV is acquired based on the detection result by the sensors 20. The driving environment information ENV is stored in the memory device 42.

Subsequent to the processing of step S11, it is determined whether or not there is a risk factor 3 in an area ahead of the vehicle VH1 (step S12). In the processing of step S12, it is determined whether or not the risk factor 3 is recognized in the area ahead of the vehicle VH1 based on the driving environment information ENV. The risk factor 3 includes at least one of a walker, a bicycle, a two wheeled vehicle, and a parked vehicle ahead of the vehicle VH1.

When the determination result of the processing in step S12 is positive, it is determined whether or not the start-up condition of the risk avoidance control is satisfied (step S13). An example of the start-up condition is that the arrival time TA at the risk factor 3 falls below the activation threshold Tth. The arrival time TA is a time required for the vehicle VH1 to travel from the actual position to a position closest to the risk factor 3. The arrival time TA can be calculated based on, for example, the current vehicle speed of the vehicle VH1, the trajectory TR0, and the relative position of the risk factor 3. The position closest to the risk factor 3 is the position where the distance from the trajectory TR0 to the risk factor 3 is the shortest.

When the determination result of the processing in step S13 is positive, the risk avoidance control is executed (step S14). The risk avoidance control is travel assist control for avoiding the risk factor 3, and includes at least one of steering control and deceleration control. On the other hand, when the determination result of the processing in step S13 is negative, the risk avoidance control is not executed (step S15). If the risk avoidance control is already being executed, the risk avoidance control being executed is stopped.

In the processing flow shown in FIG. 9, it is first determined whether or not risk avoidance control is being executed (step S21). When the determination result of the processing in step S21 is positive, information acquiring processing is performed (step S22). The content of the processing in step S22 is the same as that in step S11 in FIG. 8.

Subsequent to the processing of step S22, it is determined whether or not a predetermined vehicle operation is detected (step S23). The predetermined vehicle operation is a vehicle operation that requests cancellation of execution of the risk avoidance control that is being executed. When the risk avoidance control being executed is the decrementing assist control, the predetermined vehicle operation is an operation of depressing the accelerator pedal. When the risk avoidance control being executed is the steering assist control, the predetermined vehicle operation is a counter-steering operation.

When the determination result of the processing of step S23 is positive, the processes of steps S24 to S26 are performed. In the processing of step S24, the duration time ET is counted. In the processing of step S25, it is determined whether or not the detection of the predetermined vehicle operation detected in step S23 has ended. When the determination result of the processing in step S25 is negative, it is determined whether or not the duration time ET exceeds the specified time in the processing in step S26. If the determination result in step S26 is negative, the process returns to step S24. That is, the processes of steps S24 to S26 are repeatedly performed until a positive determination result is obtained in the processing of step S25 or a positive determination result is obtained in the processing of step S26.

When a positive judgment result is obtained in the processing of step S26, the risk avoidance control being executed is stopped (step S27). Subsequent to the processing of step S27 or if a positive judgment result is obtained in the processing of step S25, the duration time ET is reset (step S28).

In the processing flow shown in FIG. 10, it is first determined whether or not risk avoidance control is being executed (step S31). When the determination result of the processing in step S31 is positive, information acquiring processing is performed (step S32). The contents of the processing in steps S31 and S32 are the same as those in steps S21 and S22 in FIG. 9.

Subsequent to the processing of step S32, it is determined whether or not the associated risk is recognized (step S33). In the processing of step S33, to be specific, it is determined whether or not the risk (associated risk) caused by the execution of the risk avoidance control being executed is recognized based on the driving environment information ENV. Examples of the associated risk include the rear-end collision risk due to the vehicle VH2 described in FIG. 3, the collision risk with the vehicle VH3 described in FIG. 4, the slip risk described in FIG. 5, and the contact risk with the object OB described in FIG. 6.

When the judgment result of the processing in step S33 is positive, the associated risk is evaluated (step S34). In the processing of step S34, the type of the associated risk recognized in the processing of step S33 (i.e., the rear-end collision risk, the collision risk, the slip risk, and the contact risk) is specified. Then, the value of the coefficient C0 by which the specified time PT is multiplied is determined based on the specified type of the associated risk. As the value of the coefficient C0, a value corresponding to the type of the associated risk is set in advance.

In the processing of step S34, the coefficient C1 by which the specified time PT is multiplied may be determined in accordance with the height of the associated risk. In the case of the rear-end collision risk due to the vehicle VH2 described in FIG. 3, the height of the risk may be set according to a time to a collision (TTC) between the vehicle VH1 and the vehicle VH2. Also in the case of the collision risk due to the vehicle VH3 described in FIG. 4, the height of the risk may be set according to the time to-consumer collision (TTC) between the vehicle VH1 and the vehicle VH3.

Subsequent to the processing of step S34, the specified time is shortened (step S35). In the processing of step S35, the specified time PT is multiplied by the coefficient C0 or the coefficient C1 determined in the processing of step S35.

What is claimed is:

1. A method to assist a driving of a vehicle, the method comprising the steps of:

executing a travel assist control for avoiding a risk factor in front of the vehicle based on driving environment information of the vehicle;

determining an amount of time during which an operator of the vehicle performs a driving action to counteract the travel assist control after the start of the execution of the travel assist control;

stopping the execution of the travel assist control when the determined amount of time exceeds a specified time;

evaluating an associated risk caused by a continuation of the execution of the travel assist control based on the driving environment information during the determining of the amount of the time during which the operator of the vehicle performs the driving action to counteract the travel assist control; and shortening the specified time based on a result of the evaluation of the associated risk.

2. The method according to claim 1, wherein:

the travel assist control includes deceleration control for decelerating the vehicle, and the associated risk includes at least one of a rear-end collision risk caused by another vehicle traveling behind the vehicle, a collision risk with another vehicle traveling at an intersection ahead of the vehicle in a direction intersecting a travel direction of the vehicle, and a slip risk of the vehicle.

3. The method according to claim 1, wherein:

the travel assist control includes steering control for controlling a steering of the vehicle, and the associated risk includes at least one of a risk to contact with an object that is not classified as the risk factor and also is present in a direction away from the risk factor, and a risk of slippage of the vehicle.

4. A device to assist a driving of a vehicle, comprising:

a memory device in which driving environment information of the vehicle is stored; and a processor configured to:

execute a travel assist control for avoiding a risk factor in front of the vehicle based on the driving environment information;

determine an amount of time during which an operator of the vehicle performs a driving action to counteract the travel assist control after the execution of the travel assist control is started;

stop the execution of the travel assist control when the determined amount of time exceeds a specified time, evaluate an associated risk caused by a continuation of the execution of the travel assist control based on the driving environment information during the determining of the amount of the time during which the operator of the vehicle performs the travel assist control; and shorten the specified time based on a result of evaluation of the associated risk.

5. A non-transitory computer-readable medium storing a program for causing a computer to execute processing to assist a driving of a vehicle, wherein the program causes the computer to execute:

processing to execute a travel assist control for avoiding a risk factor in front of the vehicle based on driving environment information;

processing to determine an amount of time during which an operator of the vehicle performs a driving action to counteract the travel assist control after the execution of the travel assist control is started;

processing to stop the execution of the travel assist control when the determined amount of time exceeds a specified time;
processing to evaluate an associated risk caused by a continuation of the execution of the travel assist control based on the driving environment information during the determining of the amount of the time during which the operator of the vehicle performs the driving action to counteract the travel assist control; and
processing to shorten the specified time based on a result of evaluation of the associated risk.

* * * * *